(12) United States Patent  
Taylor et al.

(10) Patent No.: US 9,135,634 B1  
(45) Date of Patent: Sep. 15, 2015

(54) STATIC DISCHARGE STATION

(71) Applicants: Randy Taylor, Bonaire, GA (US);  
Bobby P Taylor, Perry, GA (US)

(72) Inventors: Randy Taylor, Bonaire, GA (US);  
Bobby P Taylor, Perry, GA (US)

( * ) Notice: Subject to any disclaimer, the term of this patent is extended or adjusted under 35 U.S.C. 154(b) by 0 days.

(21) Appl. No.: 14/338,866

(22) Filed: Jul. 23, 2014

(51) Int. Cl.
| | | |
|---|---|---|
| *H01H 47/00* | (2006.01) | |
| *H05F 3/00* | (2006.01) | |
| *H05F 3/02* | (2006.01) | |
| *G06Q 30/02* | (2012.01) | |
| *H02H 1/00* | (2006.01) | |
| *H02H 1/04* | (2006.01) | |
| *H02H 3/22* | (2006.01) | |

(52) U.S. Cl.  
CPC .............. *G06Q 30/0241* (2013.01); *H05F 3/02* (2013.01)

(58) Field of Classification Search  
USPC .......................................................... 361/220  
See application file for complete search history.

(56) References Cited

U.S. PATENT DOCUMENTS

| | | | | |
|---|---|---|---|---|
| 4,800,374 | A * | 1/1989 | Jacobson ...................... 340/649 |
| 5,457,596 | A * | 10/1995 | Yang .............................. 361/220 |
| 6,836,292 | B2 * | 12/2004 | Bean et al. ..................... 348/335 |
| 6,924,635 | B2 * | 8/2005 | Yeh ........................... 324/750.03 |
| 7,013,930 | B2 * | 3/2006 | Mann .................................. 141/1 |
| 7,068,488 | B1 * | 6/2006 | Van Leuven ................... 361/220 |
| 7,408,758 | B2 * | 8/2008 | Myers et al. ................... 361/215 |
| 7,462,242 | B2 * | 12/2008 | Cooper et al. ................. 118/629 |
| 2010/0309602 | A1 * | 12/2010 | Chien ........................... 361/220 |

\* cited by examiner

*Primary Examiner* — Dharti Patel  
(74) *Attorney, Agent, or Firm* — Charlena Thorpe, Esq.; Incorporating Innovation with Charlena Thorpe

(57) ABSTRACT

Implementations of a static discharge station are provided. In some implementations, the static discharge station may be employed by a user to discharge a build-up of static electricity prior to pumping gas. In some implementations, the static discharge station may have advertising thereon. In this way, a user or a passerby may be exposed to the displayed advertisement(s). In some implementations, the static discharge station may be comprised of a body portion having a button thereon, a support pole, a base, a wire, and a grounding rod. In some implementations, the button may be configured to selectively make contact with the support pole of the static discharge station. In some implementation, a user may discharge a static electricity build-up by touching the button. In this way, the static build-up may travel through the button, support pole, base, and wire into the grounding rod. In some implementations, the base may serve to ground the static discharge station without the use of a wire and/or grounding rod.

19 Claims, 2 Drawing Sheets

STATIC DISCHARGE STATION

TECHNICAL FIELD

This disclosure relates to implementations of a static discharge station.

BACKGROUND

Gas pumps are nearly ubiquitous throughout our society and the hazards of static electricity around gas pumps are well known. For example, a single spark may ignite flammable gas fumes causing a fire and/or explosion.

U.S. Pat. No. 7,068,488 ("'488 patent") discloses a static discharging system having an electrically conductive plate attached to the upper end of a post. The lower end of the post is mounted in the ground adjacent a gas pumping station. The '488 patent teaches to secure one end of an electrical conduit to the eclectically conductive plate and to insert the other end into the ground. The '488 patent then teaches to discharge a static build-up by making physical contact with the electrically conductive plate.

However, the static discharging system has several disadvantages. First, the static discharging system is not configured for the placement of advertisements thereon. As a result, the opportunity to advertise to the user of the static discharging system is lost. Second, the conductive plate may not be suitable for discharging static electrical build-up if it is covered by advertisements which insulate the plate.

DETAILED DESCRIPTION

Implementations of a static discharge station are provided. In some implementations, the static discharge station may be employed by a user to discharge a build-up of static electricity prior to pumping gas. In some implementations, the static discharge station may have advertising thereon. In this way, a user or a passerby may be exposed to the displayed advertisement(s).

In some implementations, the advertisements are for a plurality of businesses or products other than the gas station or retail store where the static discharge station is located or products that may be purchased at the retail store.

In some implementations, the static discharge station of the present disclosure may include advertisements from local businesses (e.g., within a certain mile radius of the advertising mat). In some implementations, the static discharge station of the present disclosure may include advertisements from any business including local, non-local, wholesale, retail, or any other business. In some implementations, the static discharge station of the present disclosure may include one or more advertisements having respective matrix barcodes (or two-dimensional codes) such as QR (Quick Response) codes. In some implementations, the one or more advertisements may include respective coupons.

In some implementations, the static discharge station of the present disclosure may be placed near a gas pump. In some implementations, the static discharge station of the present disclosure may be placed next to a gas pump. In some implementations, the static discharge station of the present disclosure may be placed within eight (8) feet of a gas pump.

In some implementations, a prospective customer may redeem a coupon advertised on the static discharge station of the present disclosure by taking a picture of the coupon with a camera, mobile telephone, tablet, smart device, or any other handheld device and displaying the electronic coupon (i.e., photo of the coupon) at the corresponding retailer. In some implementations, the prospective customer may forward the picture to another prospective customer and that person may also redeem the coupon as described above.

In some implementations, a prospective customer may use a two-dimensional code on an advertisement to retrieve a coupon on the Internet.

In some implementations, the static discharge station may be comprised of a body portion having a button thereon, a support pole, a base, a wire, and a grounding rod. In some implementations, the button may be configured to selectively make contact with the support pole of the static discharge station. In some implementations, a user may discharge a static electricity build-up by touching or pressing the button. In this way, the static build-up may travel through the button, support pole, base, and wire into the grounding rod. In some implementations, the base may serve to ground the static discharge station without the use of a wire and/or grounding rod.

Figure 1A:
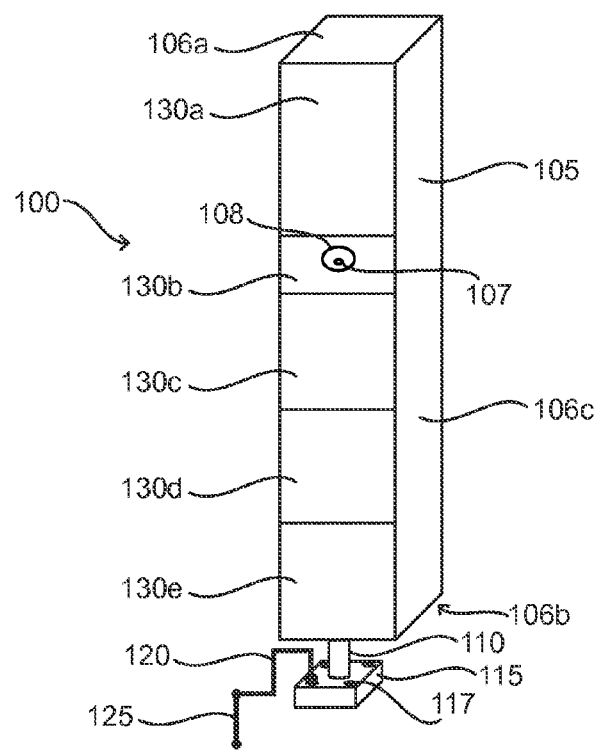
FIGS. 1A-1B illustrate an implementation of a static discharge station according to the present disclosure.
Figure 1B:
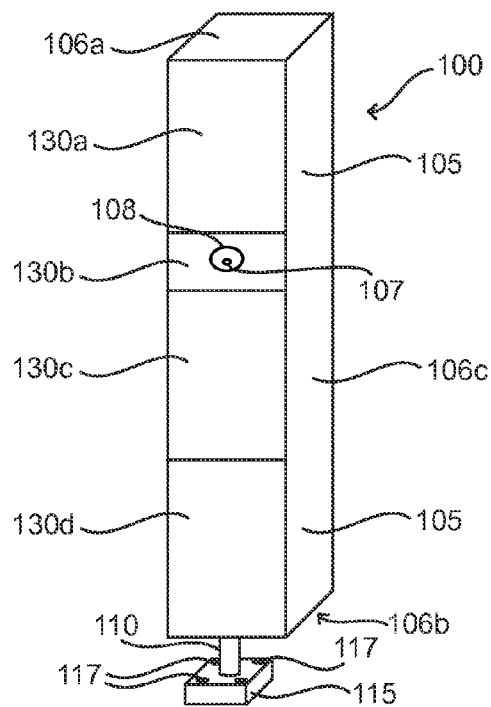
Figure 2:
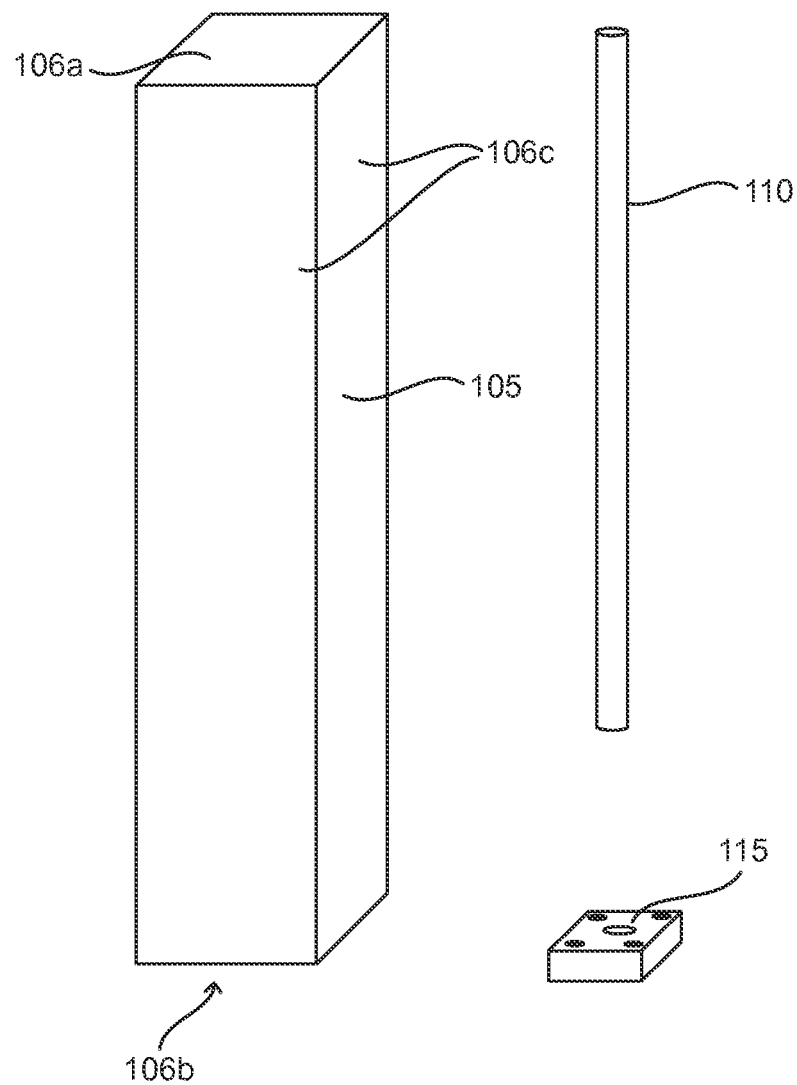
FIG. 2 illustrate implementations of the body portion, the support pole, and the base according to the present disclosure.

FIGS. 1A, 1B, and 2 illustrate an example implementation of a static discharge station 100 according to the present disclosure. In some implementations, the static discharge station may be employed by a user to discharge a build-up of static electricity prior to pumping gas. In some implementations, the static discharge station may be employed by a user to discharge a build-up of static electricity during and/or after pumping gas. In some implementations, the static discharge station may be employed by a user to discharge a build-up of static electricity under any circumstance.

In some implementations, the static discharge station may have advertising thereon. In this way, a person pumping gas or passerby may be exposed to the displayed advertisements.

In some implementations, as shown in FIGS. 1A, 1B, and 2, the static discharge station 100 may be comprised of a body portion 105 having a button 107 thereon, a support pole 110, a base 115, a wire 120, and a grounding rod 125 (see, e.g. FIG. 1A).

In some implementations, the body portion 105 may define a top side 106a, a bottom side 106b, and four side walls 106c (see, e.g., FIG. 2). In some implementations, the body portion 105 may have more than four or less than four side walls. For example, in some implementations, the body portion 105 may be shaped like a rectangular prism (see, e.g., FIG. 2) having a top side 106a, a bottom side 106b, and four side walls 106c. In some implementations, the body portion 105 may be any shape with any number of sidewalls suitable for displaying advertising thereon. In some implementations, the body portion 105 may be a flat surface.

In some implementations, the body portion 105 may be configured to display advertising thereon. In some implementations, advertising may be displayed on a side wall or other surface of the body portion 105. In some implementations, advertising may be displayed on each of the side walls of the body portion 105. For example, in some implementations, advertising may be displayed on each of the four side walls 106c of the body portion 105. In some implementations, advertising may be displayed on less than each of the side walls of the body portion 105. In some implementations, the side walls 106c may be shaped like a rectangle. In some implementations, the side walls 106c may be any shape suitable for displaying advertising thereon.

In some implementations, multiple advertisements having one or more advertisers 130a-e (see, e.g., FIG. 1A), may be displayed on one or more side walls 106c of the body portion 105. In some implementations, only a single advertisement may be displayed on one or more side walls 106c of the body portion 105. In some implementations, no advertising may be displayed on one or more side walls 106c of the body portion 105.

In some implementations, advertising may be secured directly to the one or more side walls 106c of the body portion 105. In some implementations, advertising may be printed on any suitable material having an adhesive on one side suitable for adhering to the one or more side walls 106c of the body portion 105. In some implementations, the body portion 105 may have a transparent display behind which advertising may be placed. In some implementations, advertising may be secured to the body portion 105 of the static discharge station 100 by any method known, presently or developed in the future, to one of ordinary skill in the art.

In some implementations, there may be an opening (not shown) in the bottom side 106b of the body portion 105 configured to receive the support pole 110 therein. In some implementations, the body portion 105 may not have a bottom side 106b. The support pole 110 may be attached to the body portion 105 in any suitable manner. In this way, the body portion 105 may be held in an upright position.

In some implementations, one of the side walls 106c of the body portion 105 may have an opening 108 for a button 107 therein (see, e.g., FIG. 1A). In some implementations, two or more of the side walls 106c may having an opening 108 for a button 107 therein.

In some implementations, the button 107 may be configured to selectively make contact with the support pole 110. In this way, static electricity accumulated on a user may be discharged through the button 107 and the connected support pole 110 when the user makes contact with and/or depresses the button 107. In some implementations, the button 107 may be spring loaded. In this way, the button 107 does not make contact with the support pole 110 until it is depressed. In some implementations, the button 107 may be directly connected to the support pole 110. In some implementations, the button 107 may be manufactured from an electrically conductive material. In some implementation the button may be made from any material(s) suitable for use with the static discharge station 100.

In some implementations, the button 107 may be 5 to 6 inches in diameter. In some implementations, the button 107 may be more than 6 inches or less than 5 inches in diameter. In some implementations, the button 107 may be red. In some implementations, the button 107 may be any color or combination of colors. In some implementations the button 107 may have a message printed thereon, for example, "DANGER ALWAYS DISCHARGE STATIC HERE AFTER TAKING HAND OFF GAS NOZZLE!"

In some implementations, the support pole 110 may be shaped like a cylinder (see, e.g., FIG. 2). In some implementations, the support pole 110 may be any shape suitable for use with a static discharge station. In some implementations, the support pole 110 may be made of an electrically conductive material. In some implementations, the support pole 110 may be made of a metal. In some implementations, the support pole 110 may be made from any material suitable for use as part of the electric discharge station 100.

In some implementations, the base 115 of the static discharge station 100 may be configured to receive a portion of the support pole 110 therein (see, e.g., FIG. 1B). In this way, the base 115 may hold the support pole 110 in an upright position. In some implementations, the base 115 may be shaped like a square. In some implementations, the base 115 may be shaped like a circle. In some implementations, the base 115 may be any shape suitable for holding the support pole 110 in an upright position.

In some implementations, the base 115 may include four openings 117 therethrough (see, e.g., FIG. 1A). In some implementations, the base 115 may include more than four or less than four openings 117 therethrough. In some implementation, each opening 117 may be configured to receive therein a bolt, nail, rod, or other apparatus suitable for securing the base 115 to the ground or other suitable mounting surface. In this way, the static discharge station 100 may be secured to the ground or other suitable mounting surface through the use of the base 115. In some implementations, the base 115 may be made of a metal. In some implementations, the base 115 may be made from any material suitable for use as part of the electric discharge station 100.

One of ordinary skill in the art with the benefit of this disclosure would know what material(s) may be used for the button 107, support pole 110, and base 115.

In some implementations, a wire 120 may be secured in one of the openings 117 of the base 115 (see, e.g., FIG. 1A). In some implementations, more than one wire 120 may be secured within an opening 117 of the base 115. In some implementations, more than one opening 117 of the base 115 may have one or more wires 120 secured therein. In some implementations, the wire 120 may be manufactured from an electrically conductive material. In some implementations, the wire 120 may be insulated. In some implementations, one or more wires 120 may be secured to the base 115 at a location other than the one or more openings 117. In some implementations, the wire 120 may be secured to the base 115 by any suitable method known to one of ordinary skill in the art.

In some implementation, the grounding rod 125 may be connected to the static discharge station through the wire 120 (see, e.g., FIG. 1A). In this way, a user's static electricity build-up may be grounded by traveling through the button 107, support pole 110, base 115, and wire 120 into the grounding rod 125. In some implementations, the grounding rod 125 may have a cylindrical shape. In some implementations, the grounding rod 125 may be any suitable shape for insertion into the ground or other suitable location.

In some implementations, the base 115 may serve to ground the static discharge station 100 without the use of a wire 120 and/or grounding rod 125.

To use the static discharge station 100 according to the present disclosure, a user may press or touch the button 107 located on a side wall 106c of the body portion 105. In this way, the static electricity built-up on the user may be safely discharged through the static discharge station 100. In some implementations, a user may be exposed to advertising located on one or more side walls 106c of the static discharge station 100 during its use and/or when approaching the static discharge station 100.

In some implementations, the body portion 105 of the static discharge station 100 may include a trash can (not shown). In some implementations, the trash can may be located within an enclosure formed by the side walls 106c of the body portion 105 and may be accessed by one or more openings in the one or more side walls 106c.

In some implementations, the body portion 105 of the static discharge station may include a window washing station (not shown). In some implementations, the container for the window cleaning solution can may be located within an enclosure formed by the side walls 106c of the body portion 105 and may be accessed by one or more openings in the one or more side walls 106c.

In some implementations, the body portion 105 of the static discharge station 100 may include a product display (not shown). In some implementations, the product display may be located within an enclosure formed by the side walls 106c of the body portion 105 and may be accessed by one or more openings in the one or more side walls 106c.

In some implementations, the body portion 105 of the static discharge station may include a towel holder. In some implementations, the towel holder may be located within an enclosure formed by the side walls 106c of the body portion 105 and may be accessed by one or more openings in the one or more side walls 106c.

In some implementations, the body portion 105 of the static discharge station may include a fire extinguisher (not shown). In some implementations, the fire extinguisher may be located within an enclosure formed by the side walls 106c of the body portion 105 and may be accessed by one or more openings in the one or more side walls 106c.

In some implementations, the body portion 105 may be made of plastic(s). In some implementations, the body portion 105 may be made of Plexiglass®. In some implementations, the body portion 105 may be made from any suitable material.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A static discharge station comprising:
    a body portion having one or more side walls;
    a support pole attached to the body portion;
    a base attached to the support pole and secured to a grounding surface; and
    a button located on at least one of the side walls, the button being operably connected to the base through the support pole;
    wherein the button, support pole, and base are configured to discharge a static electrical build-up when the users makes contact with the button.

2. The static discharge of claim 1 wherein the body portion is shaped like a rectangular prism.

3. The static discharge of claim 1 wherein body portion has four side walls.

4. The static discharge station of claim 1 wherein at least one side wall includes at least one advertisement thereon.

5. The static discharge station of claim 1 wherein at least one side wall includes two or more advertisements thereon from two or more advertisers.

6. The static discharge station of claim 5, wherein the two or more advertisements include advertisements from businesses within a predetermined distance of the static discharge station.

7. The static discharge station of claim 5, wherein the two or more advertisements include respective matrix barcodes.

8. The static discharge of claim 1 wherein the button, the support pole, and the base are made of an electrically conductive material.

9. The static discharge of claim 1 wherein the button is configured to make contact with support pole when a user presses the button.

10. The static discharge of claim 1 further comprising a trash can located within an enclosure formed by the side walls.

11. The static discharge of claim 1 further comprising a window washing station located within an enclosure formed by the side walls.

12. The static discharge station of claim 1 further comprising a wire and a grounding rod, wherein the wire is connected to the base and the grounding rod.

13. The static discharge of claim 2 wherein the button, the support pole, the base, the wire, and the grounding rod are made of an electrically conductive material.

14. A method of advertising using the static discharge station of claim 1 comprising:
    placing the static discharge station near a gas pump.

15. The method of advertising of claim 14 wherein the static discharge station is placed within eight feet of a gas pump.

16. The method of advertising of claim 14 wherein at least one side wall includes at least one advertisement thereon.

17. The method of advertising of claim 14 wherein at least one side wall includes two or more advertisements thereon from two or more advertisers.

18. The method of advertising of claim 17 wherein the two or more advertisements include advertisements from businesses within a predetermined distance of the static discharge station.

19. The method of advertising of claim 17 wherein the two or more advertisements include respective matrix barcodes.

\* \* \* \* \*